(12) United States Patent  
Lahdensivu

(10) Patent No.: US 9,092,239 B2
(45) Date of Patent: Jul. 28, 2015

(54) CONFIGURING USER INTERFACES IN ELECTRONIC DEVICES

(75) Inventor: Kimmo Lahdensivu, Lempäälä (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1196 days.

(21) Appl. No.: 11/416,795

(22) Filed: May 2, 2006

(65) Prior Publication Data

US 2007/0260749 A1    Nov. 8, 2007

(51) Int. Cl.
G06T 1/60 (2006.01)
G06F 15/16 (2006.01)
G06F 9/44 (2006.01)

(52) U.S. Cl.
CPC .................... *G06F 9/4443* (2013.01)

(58) Field of Classification Search
USPC ......................................................... 709/221
See application file for complete search history.

(56) References Cited

U.S. PATENT DOCUMENTS

| 7,234,111 | B2* | 6/2007 | Chu et al. ...................... 715/251 |
| 2003/0200283 | A1* | 10/2003 | Suryanarayana et al. .... 709/219 |
| 2004/0217980 | A1* | 11/2004 | Radburn et al. ............... 345/672 |
| 2004/0240408 | A1* | 12/2004 | Gur .............................. 370/328 |
| 2005/0039126 | A1* | 2/2005 | Katano ......................... 715/700 |
| 2005/0240756 | A1* | 10/2005 | Mayer ............................. 713/2 |
| 2007/0067808 | A1* | 3/2007 | DaCosta ......................... 725/62 |

OTHER PUBLICATIONS

JP 07-244568—Akiko et al "Method and device for preparing display screen" Sep. 1995.*
JP 07-244568—Engish Translation.*

* cited by examiner

*Primary Examiner* — Angela Nguyen

(57) ABSTRACT

A method and an electronic device arranged to execute application programs, wherein the device comprises an operating system enabling a separation of user interface data from the rest of the data processing system, the device being arranged to check, in response to starting an execution of the application program, whether screen size information of the application program corresponds to a display size of the terminal; and download, in response to the screen size of the application program differing from the display size of the terminal, a new user interface file with an appropriate screen size from a network server.

11 Claims, 1 Drawing Sheet

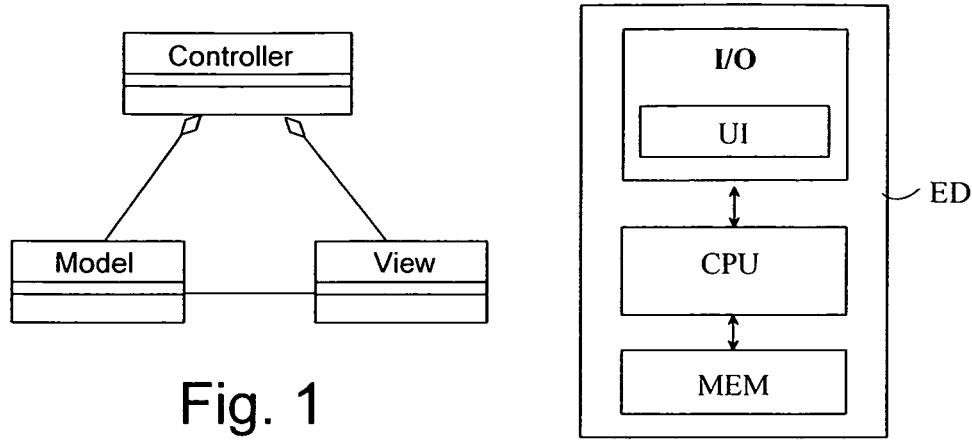
Fig. 1
Fig. 3
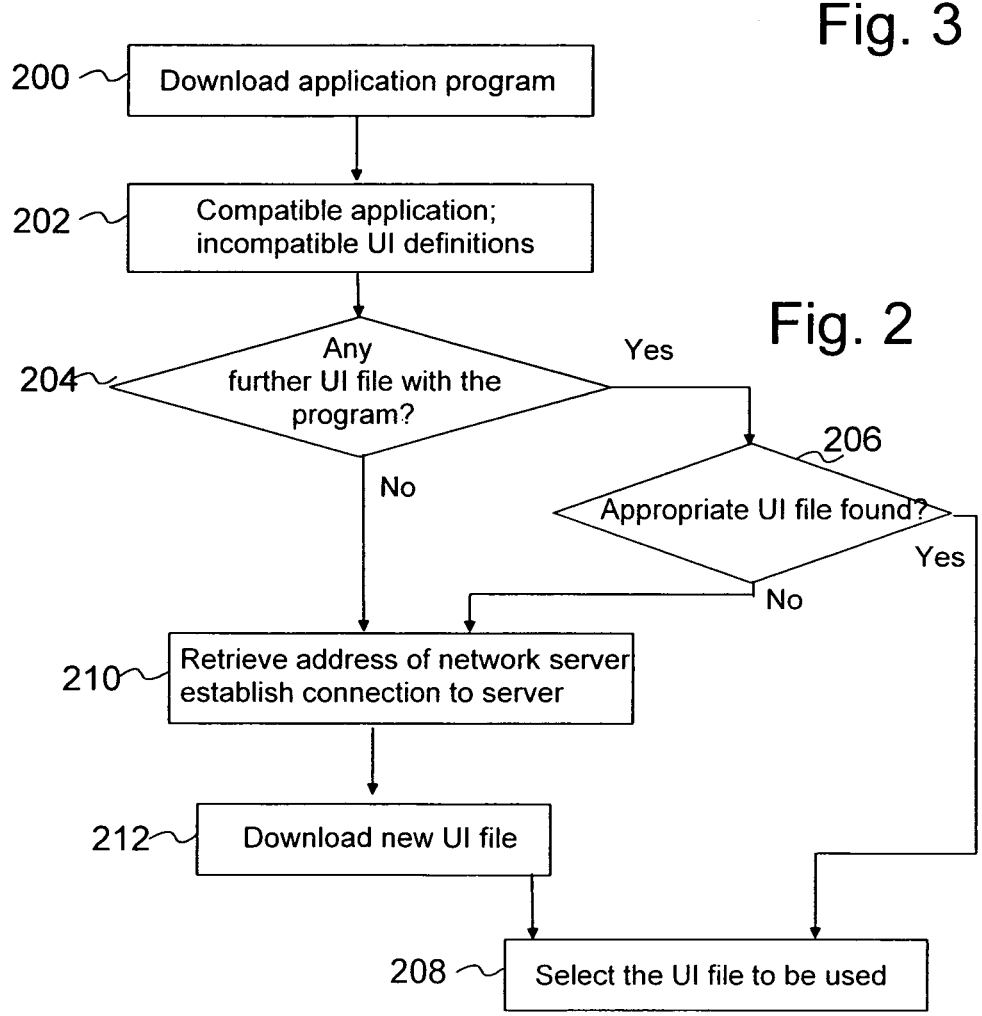
Fig. 2

CONFIGURING USER INTERFACES IN ELECTRONIC DEVICES

FIELD OF THE INVENTION

The present invention relates to electronic devices provided with displays, and particularly to configuring user interfaces in such devices.

BACKGROUND OF THE INVENTION

It is generally known that portable electronic devices, like mobile stations, PDA devices and portable computers, are provided with displays of various sizes. For example 128×128/160 and 176×208 pixels are known resolutions of a mobile station display, while some PDA devices may have a display resolution of 640×200/320 pixels. Due to the differences in display resolution and size, application programs for mobile phones and PDA devices are created for each display size separately.

This causes inconveniency for both application developers and end-users. Application developers must create different software versions for each available display size. For example an application designed for a mobile station with a display size of 176×208 pixels cannot be typically run in a PDA device with a display size of 640×200 pixels, and vice versa, even though the application itself may otherwise be a compatible application for both devices. An end-user, in turn, may have a plurality of mobile devices with various display sizes. An application, compatible as such with a plurality of devices, could be stored in a memory card and executed in all compatible devices by inserting the memory card in each device at a time, but due to the differences in display resolution, the application cannot be run in every device.

SUMMARY OF THE INVENTION

Now there is invented an improved method and technical equipment implementing the method, by which it is possible to use the same application in electronic devices with displays of different sizes. Various aspects of the invention include a method, an electronic device and a computer program, which are characterized by what is stated in the independent claims. Various embodiments of the invention are disclosed in the dependent claims.

According to a first aspect, a method according to the invention is based on the idea of updating a user interface file for an application program in a terminal comprising an operating system enabling a separation of user interface data from the rest of the data processing system such that when an execution of the application program is started, it is checked whether screen size information of the application program corresponds to a display size of the terminal; and in response to the screen size of the application program differing from the display size of the terminal, a new user interface file with an appropriate screen size is downloaded from a network server.

According to an embodiment, the screen size information of the application program is stored in a user interface descriptor of the application program.

According to an embodiment, prior to downloading the new user interface file from the network server, it is examined whether the application program includes any further user interface files; and a user interface file appropriate for the terminal is selected for further usage, if included in the application program.

According to an embodiment, the application program includes a network address of the network server providing user interface files to be downloaded.

According to an embodiment, the operating system is the Symbian® operating system.

The arrangement according to the invention provides significant advantages. A software developer can create a plurality of user interface files applicable with the one and the same application file, whereby no separate application files are required for each user interface type. This facilitates software development and enables the reuse of the application software as such. On the other hand, the end-user may utilize the one and the same application in a plurality of devices with various display sizes only by downloading an appropriate user interface file for each device.

According to a second aspect, there is provided an electronic device arranged to execute application programs, the device comprising an operating system enabling a separation of user interface data from the rest of the data processing system and the device being arranged to check, in response to starting an execution of the application program, whether screen size information of the application program corresponds to a display size of the terminal; and download, in response to the screen size of the application program differing from the display size of the terminal, a new user interface file with an appropriate screen size from a network server.

According to a third aspect, there is provided a computer program product, stored on a computer readable medium and executable in a data processing device, for updating a user interface file for an application program, the computer program product comprising: a computer program code section for starting an execution of the application program; a computer program code section for checking whether screen size information of the application program corresponds to a display size of the terminal; and a computer program code section, responsive to the screen size of the application program differing from the display size of the terminal, for downloading a new user interface file with an appropriate screen size from a network server.

BRIEF DESCRIPTION OF THE DRAWINGS

In the following, various embodiments of the invention will be described in more detail with reference to the appended drawings, in which FIG. 1 shows a basic principle of a Model-View-Controller programming model;

FIG. 2 shows a flow chart of a method for updating a user interface file according to an embodiment of the invention; and FIG. 3 shows a reduced block diagram of an electronic device according to an embodiment of the invention.

DESCRIPTION OF EMBODIMENTS

A Model-View-Controller (MVC) model is one of the most widely used programming models for graphical user interfaces (GUIs). The MVC is derived from a traditional system model including input, processing, and output. Similarly, in the MVC model an application, or even just a piece of an application's interface, is separated into three parts: the model, the view, and the controller. The controller represents the input, the model represents the processing and the view represents the output.

The separation of the logical parts of the user interface is especially applicable to be implemented in an object-oriented software environment, wherein the distinguished objects can be reused for various tasks and events. The user input, the modeling of the external world, and the visual feedback to the user are separated and handled by model, view and controller objects.

The controller interprets mouse and keyboard inputs from the user and maps these user actions into commands that are sent to the model and/or view to effect the appropriate change. Accordingly, the controller defines the behaviour of an application. The model manages one or more data elements, responds to queries about its state, and responds to instructions to change the state. Thus, the model encapsulates the application state and data, exposes the application functionality and notifies the view of any changes.

The view manages the display screen and is responsible for presenting data to the user as a combination of graphics and text. The view typically has a one-to-one correspondence with a display surface and knows how to render to it. The view attaches to the model and renders its contents to the display surface. In addition, when the model changes, the view automatically redraws the affected part of the image to reflect those changes. There can be multiple views onto the same model and each of these views can render the contents of the model to a different display surface. Accordingly, the view may be a composite view containing several sub-views, which may, in turn, contain several sub-views.

The model, the view and the controller are intimately related and in constant contact. Therefore, they must reference each other. FIG. 1 illustrates the basic lines of communication among the model, the view and the controller. The model has a base class pointer towards the view, which allows it to send weakly-typed notifications of change to the view, but the model is not aware of the types of views which observe it. By contrast, the view knows exactly what kind of model it observes. The view also has a strongly-typed pointer to the model, allowing it to call any of the model's functions. In addition, the view also has a pointer to the controller, but it should not call functions in the controller aside from those defined in the base class. The controller has pointers to both the model and the view and it is aware of their types, as well. Since the controller defines the behaviour of an application, it must know the type of both the model and the view in order to translate user input into application response.

When creating application software for MVC-based frameworks, the applications must include user interface (UI) descriptors in order to guide the application to read user interface definitions from an appropriate memory location. Descriptors provide a safe, consistent and economical mechanism for containing, accessing and manipulating strings and general binary data. The data represented by descriptors resides in a defined location in a memory. A UI descriptor is an object that knows how to create an appropriate user interface layout. It does not include any interface data as such, but it rather includes instructions to create a user interface when required. A UI descriptor is a lightweight representation of a user interface that can be manipulated without affecting to the actual user interface data.

Now the separation of a user interface layer (view) from the input data (controller) and the logic (model) processing the input data provides an advantageous framework for the implementation of the present invention. According to an embodiment, screen size information of a desirable display is included in the UI descriptor of an application, and when the application is downloaded and started to execute in an electronic device, it is checked whether the screen size information of the application matches to the display size of the electronic device. If the display of the electronic device is incompatible with the desirable display of the application, the electronic device checks a network address included in the application, which network address provides a link to a server including a plurality of various user interface layers for the particular application. If a user interface matching with the display of the electronic device is available in the server, it is downloaded in the electronic device for further execution.

Accordingly, a software developer can create a plurality of user interface files applicable with the one and the same application file, whereby no separate application files are required for each user interface type. This facilitates software development and enables to reuse the application software as such. On the other hand, the end-user may utilize the one and the same application in a plurality of devices with various display sizes only by downloading an appropriate user interface file for each device.

According to an embodiment, a software package may in the first instance, i.e. when bought or downloaded for the first time in a device, include several different user interface files by default. Then, if the primary user interface file does not match with the display of the electronic device, the other user interface files included in the software package are examined. If a matching user interface is found in the package, it is naturally selected for further usage. However, if no matching user interface is found in the package, a connection is then established to the network server for retrieval of an appropriate user interface file.

A method according to an embodiment is further illustrated in a flow chart of FIG. 2. An application program previously used in a first electronic device, e.g. a mobile station with a display size of 176×208 pixels, is downloaded (200) in a second electronic device with a different size of display, such as a PDA device with a display size of 640×200 pixels. The application program may be stored in a memory card, for instance, whereby the memory card may be exchanged between the devices. The second electronic device notices (202) that the application program, as such, is compatible with its operating system, but the dimensions and/or the size of the user interface indicated in the UI descriptors are not suitable for the display of the second electronic device. Consequently, the electronic device examines (204) the software package of the application program, whether it includes any further user interface file. If an appropriate user interface file is found (206) in the package, it is selected (208) to be further used with the application program. If no appropriate user interface file is found in the package, the electronic device retrieves a network address, such as an URL (Uniform Resource Location) address usable on IP connections, from a predefined location of the application file and establishes (210) a connection to a network server by using the network address. Then an appropriate user interface file is downloaded (212) from the server, and the downloaded file is then selected (208) for usage with the application program.

FIG. 3 illustrates the basic structure of an electronic device (ED) according to an embodiment, which electronic device may be e.g. a wireless mobile station, a PDA device or a PC-based computer. The electronic device (ED) comprises a central processing unit (CPU), a memory (MEM) and an I/O system (I/O). All the necessary information is stored in the memory (MEM) of the device. The memory (MEM) comprises a read-only memory part, which may consist e.g. of a RAM (Random Access Memory) and/or FLASH memory. Through the I/O system (I/O), the device communicates e.g. with other devices, a network and a user. A user interface (UI), which is a part of the I/O system (I/O), comprises an interface necessary for communicating with the user, such as a display, keypad, loudspeaker and/or a microphone. Information obtained from different components of the device is delivered to the central processing unit (CPU), which processes the received information in a desired manner.

The electronic device is preferably provided with an operating system enabling the separation of the user interface layer from the rest of the data processing system. An operating system providing this advantageous framework is the Symbian® operating system, which is commonly used in many portable wireless terminals.

The steps according to the embodiments can be largely implemented with program commands executed in the central processing units CPU of the electronic device ED. Thus, said means for carrying out the method described above are typically implemented as computer software code. The computer software may be stored into any memory means, such as the hard disk of a PC or a CD-ROM disc, from where it can be loaded into the memory of mobile terminal. The computer software can also be loaded through a network, for instance using a TCP/IP protocol stack. It is also possible to use hardware solutions or a combination of hardware and software solutions for implementing the inventive means.

It is obvious that the present invention is not limited solely to the above-presented embodiments, but it can be modified within the scope of the appended claims.

What is claimed is:

1. A method comprising:
   starting an execution of an application program in a terminal comprising an operating system enabling a separation of user interface data from the rest of a data processing system;
   checking at the terminal whether screen size information of the application program whose execution has been started in the terminal corresponds to a display size of the terminal; and
   in response to the screen size of the application program differing from the display size of the terminal, downloading from a network server a new user interface file containing a user interface descriptor with an appropriate screen size for use by said application program so as to correspond to the display size of said terminal.

2. The method according to claim 1, further comprising:
   prior to downloading the new user interface file from the network server, examining whether the application program includes any further user interface files; and
   selecting a user interface file appropriate for the terminal for further usage, if included in the application program.

3. The method according to claim 1, wherein the application program includes a network address of the network server providing user interface files to be downloaded.

4. An electronic device comprising:
   a data processing unit;
   a memory, coupled to said data processing unit, for storage of an operating system and application programs, said operating system enabling a separation of user interface data from the rest of data processing operations;
   an input/output interface coupled to said memory and data processing unit;
   the data processing unit being configured to check, in response to starting an execution of one of the application programs in a terminal, whether screen size information of the application program whose execution has been started in the terminal corresponds to a display size of the terminal; and
   the input/output interface being configured to download from a network server, in response to the screen size of the application program differing from the display size of the terminal, a new user interface file containing a user interface descriptor with an appropriate screen size for use by said application program so as to correspond to the display size of said terminal.

5. The device according to claim 4, the device being further configured to:
   examine, prior to downloading the new user interface file from the network server, whether the application program includes any further user interface files; and
   select a user interface file appropriate for the terminal for further usage, if included in the application program.

6. The device according to claim 4, wherein the device is configured to retrieve a network address of the network server from a predefined location in the application program.

7. The device according to claim 4, wherein the operating system is the Symbian operating system.

8. A computer program product, stored on a non-transitory computer readable medium and executable in a data processing device, for updating a user interface file for an application program, the computer program product comprising:
   a computer program code section for starting an execution of the application program in a terminal;
   a computer program code section for checking whether screen size information of the application program whose execution has been started in the terminal corresponds to a display size of the terminal; and
   a computer program code section, responsive to the screen size of the application program differing from the display size of the terminal, for downloading from a network server a new user interface file containing a user interface descriptor with an appropriate display size for use by said application program so as to correspond to the display size of said terminal.

9. The computer program product according to claim 8, further comprising:
   a computer program code section for examining, prior to downloading the new user interface file from the network server, whether the application program includes any further user interface files; and
   a computer program code section for selecting a user interface file appropriate for the terminal for further usage, if included in the application program.

10. The computer program product according to claim 8, further comprising:
    a computer program code section for retrieving a network address of the network server from a predefined location in the application program.

11. The computer program product according to claim 8, wherein the computer program product is compatible with Symbian operating system.

\* \* \* \* \*